(12) United States Patent
Cuvillier (10) Patent No.: US 11,953,797 B2
(45) Date of Patent: Apr. 9, 2024

(54) TRIM ELEMENT COMPRISING MODULAR BACKLIT AREAS

(71) Applicant: FAURECIA INTERIEUR INDUSTRIE, Nanterre (FR)

(72) Inventor: Christophe Cuvillier, Saint Ouen l'Aumône (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 169 days.

(21) Appl. No.: 17/731,086

(22) Filed: Apr. 27, 2022

(65) Prior Publication Data

US 2022/0365386 A1 Nov. 17, 2022

(30) Foreign Application Priority Data

Apr. 27, 2021 (FR) .................................. 21 04341

(51) Int. Cl.
| | | |
|---|---|---|
| G02F 1/137 | (2006.01) | |
| B60Q 3/14 | (2017.01) | |
| B60Q 3/217 | (2017.01) | |
| B60Q 3/62 | (2017.01) | |
| B60R 13/02 | (2006.01) | |
| F21V 8/00 | (2006.01) | |

(52) U.S. Cl.
CPC .......... *G02F 1/13775* (2021.01); *B60Q 3/62* (2017.02); *B60R 13/0243* (2013.01); *B60R 13/0256* (2013.01); *B60R 13/0262* (2013.01); *G02B 6/0055* (2013.01); *B60Q 3/14* (2017.02); *B60Q 3/217* (2017.02); *G02F 2203/01* (2013.01)

(58) Field of Classification Search
CPC . G02F 1/133775; G02F 2203/01; B60Q 3/62; B60Q 3/14; B60Q 3/217; B60Q 3/20; B60R 13/0243; B60R 13/0256; B60R 13/0262; G02B 6/0055
USPC ......................................................... 362/511
See application file for complete search history.

(56) References Cited

U.S. PATENT DOCUMENTS

| | | | |
|---|---|---|---|
| 10,937,376 B2 * | 3/2021 | Hirotsune | ............ G09G 3/3648 |
| 2009/0051853 A1 | 2/2009 | Thomas et al. | |
| 2015/0355514 A1 | 12/2015 | Lin et al. | |
| 2016/0325674 A1 * | 11/2016 | Krull | ........................ B60Q 3/64 |

OTHER PUBLICATIONS

French Search Report corresponding to French Application No. FR 2104341, dated Nov. 24, 2021, 2 pages.

* cited by examiner

*Primary Examiner* — Laura K Tso (74) *Attorney, Agent, or Firm* — Reising Ethington P.C.

(57) ABSTRACT

A trim element having a first aspect layer, a lighting device emitting light to the first aspect layer, and a first obturation layer extending between the lighting device and the first aspect layer. The first obturation layer includes at least two first optical obturation areas, configurable between an open position, in which a first optical obturation area lets light pass through, and a closed position, in which a first optical obturation area prevents the passage of light. The trim element includes a second aspect layer and a second obturation layer having at least two second optical obturation areas that are configurable between an open position and a closed position.

10 Claims, 7 Drawing Sheets

FIG.7

TRIM ELEMENT COMPRISING MODULAR BACKLIT AREAS

TECHNICAL FIELD

The present invention relates to a vehicle trim element of the type comprising a first at least partially translucent aspect layer defining an outer surface and an inner surface, at least one lighting device opposite the outer surface, extending on the inner surface side of the first aspect layer and emitting light toward said first aspect layer, and a first obturation layer extending between the lighting device and the first aspect layer said first obturation layer comprising at least two first optical obturation areas, each first optical obturation area being configurable between an open position, in which said first optical obturation area allows light to pass from the lighting device to the first aspect layer, and a closed position, in which said first optical obturation area prevents the passage of light from the lighting device to the first aspect layer

BACKGROUND

It is known to provide backlit areas on the outer surface of a trim element in order to illuminate patterns such as pictograms or decorative designs on that outer surface.

For this purpose, it is for example provided to use an obturation layer comprising optical obturation areas which can be controlled to be translucent or opaque. This obturation layer placed between a light source and the outer surface of the trim element thus makes it possible to modulate the illumination of the outer surface according to which optical obturation areas are translucent and which are opaque. It is thus possible to modify the appearance of the external surface of the trim element by selecting the optical obturation areas letting light from the light source through, and those blocking the passage of this light.

However, this modularity remains limited, as a given external surface area can only have two distinct appearances, one when this area is backlit because it is opposite an optical obturation area in the open position and the other when this area is not illuminated because it is opposite an obturation area in the closed position.

SUMMARY

One object of the invention is to overcome this drawback by providing a trim element offering a high degree of modularity in its outer surface appearance.

To this end, the invention relates to a trim element of the aforementioned type, comprising at least a second at least partially translucent aspect layer, extending between the lighting device and the first obturation layer, and at least a second obturation layer extending between the lighting device and the second aspect layer, said second obturation layer comprising at least two second optical obturation areas, each second optical obturation area being configurable between an open position, in which said second optical obturation area allows light to pass from the lighting device to the second aspect layer, and a closed position, in which said second optical obturation area prevents the passage of light from the lighting device to the second aspect layer.

By using a second aspect layer and a second obturation layer, the appearance of the outer surface can be modified significantly. Indeed, a given area of this external surface can then have at least three different appearances: the appearance of the first aspect layer not backlit by placing the first and second optical obturation areas opposite this area in the closed position, of the first aspect layer backlit by placing these first and second optical obturation areas in the open position, or of the second aspect layer by placing the first optical obturation area in the open position and the second optical obturation area in the closed position. This number of appearances can be further increased by selecting first and second optical obturation areas of different shapes and/or sizes and/or by not placing the first and second optical obturation areas opposite each other and/or by providing a different number of first optical obturation areas and second optical obturation areas. Thus, the trim element has a highly switchable appearance, which increases the amount of information that can be displayed on the outer surface and/or improves the aesthetics of the trim element.

The trim element may also include one or more of the following features, considered alone or in any technically feasible combination:
  the trim element is configurable at least between:
    a first configuration, in which the second optical obturation areas are in the open position and at least one of the first optical obturation areas is in the open position so that the area of the first aspect layer facing said first optical obturation area in the open position is illuminated by the lighting device,
    a second configuration, in which the first optical obturation areas are in the open position and at least one of the second optical obturation areas is in the open position so that the area of the first aspect layer opposite said second optical obturation area in the open position is illuminated by the lighting device;
  the area of the first aspect layer illuminated in the first configuration has a different appearance than the area of the first aspect layer illuminated in the second configuration;
  the trim element further comprises a third at least partially translucent aspect layer extending between the lighting device and the second obturation layer and a third obturation layer extending between the lighting device and the third aspect layer, said third obturation layer comprising at least two third optical obturation areas, each third optical obturation area being configurable between an open position, in which said third optical obturation area allows light to pass from the lighting device to the third aspect layer, and a closed position, in which said third optical obturation area prevents the passage of light from the lighting device to the third aspect layer;
  the third optical obturation areas are in the open position in the first configuration and in the second configuration, the trim element being further configurable in a third configuration, in which the first optical obturation areas and the second optical obturation areas are in the open position and at least one of the third optical obturation areas is in the open position so that the area of the first aspect layer facing said third optical obturation area in the open position is illuminated by the illumination device;
  the trim element further comprises at least one pattern layer extending between the first aspect layer and the first obturation layer or on the outer surface of the first aspect layer, said pattern layer comprising at least one translucent area, letting light emitted by the lighting device pass through, and at least one opaque area preventing the light emitted by the lighting device from passing through;

the lighting device comprises at least one light source and at least one light guide arranged to guide the light from the light source to the external surface;

the aspect layers and the obturation layers extend over a support, said support extending around the light guide;

the light guide is encapsulated by a reflective material arranged to reflect light from the light source to the outer surface;

each obturation layer is formed by an electrochemical film or a film of liquid crystals dispersed in a polymeric material, the optical obturation areas changing from the closed to the open position by application of an electric current to said optical obturation areas.

BRIEF DESCRIPTION OF THE DRAWINGS

Further aspects and advantages of the invention will become apparent from the following description, given by way of example and made with reference to the appended drawings, in which.

DETAILED DESCRIPTION

Figure 1:
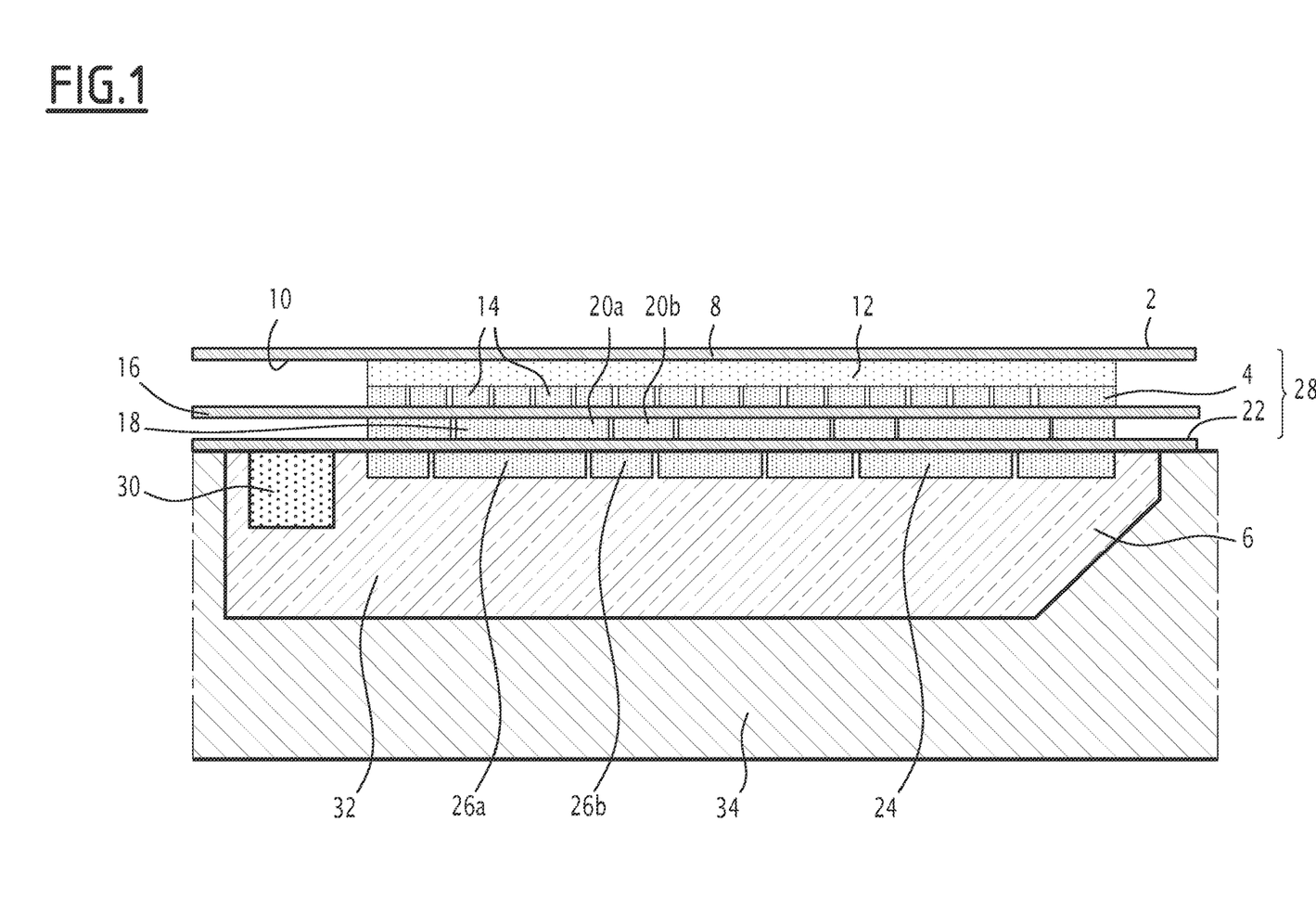
FIG. 1 is a schematic cross-sectional representation of a portion of a trim element according to an embodiment of the invention, with the optical obturation areas in the closed position.

With reference to FIG. 1, a vehicle trim element 1 comprising at least a first aspect layer 2, a first obturation layer 4 and a lighting device 6 is described. Such a trim element 1 forms, all or part of a door panel, a center console, a vehicle instrument panel, for example or such like.

The first aspect layer 2 comprises an outer surface 8 and an inner surface 10, opposite the outer surface 8 and extending on the inner side of the trim element 1.

In the description, the term "outer" refers to that which faces outwardly of the trim element 1 on the side of the vehicle passenger compartment in which the trim element is installed and the term "inner" refers to that which faces the portion of the vehicle on which the trim element is installed.

According to one embodiment, the outer surface 8 of the first aspect layer 2 forms at least a part of the visible surface of the trim element. Thus, according to this embodiment, the outer surface 8 confers to at least a portion of the trim element its appearance.

The inner surface 10 is intended to face the portion of the vehicle on which the trim element 1 is intended to be installed. The first aspect layer 2 is at least partially translucent, i.e. it is translucent at least in a display area of the outer surface 8, in which the appearance of the outer surface 8 can be modified, as will be described later. Translucent means a light transmission rate of between 5% and 100%, with 100% corresponding to a transparent layer. The first aspect layer 2 may be made translucent either by the material forming the first aspect layer 2 or by its thickness. According to one embodiment, the first aspect layer 2 is formed by a translucent film or skin.

According to one embodiment, a pattern layer 12 extends over at least a portion of the inner surface 10 of the first aspect layer 2, at least opposite the display area of the outer surface 8. Such a pattern layer 12 is printed on the inner surface 10 of the first aspect layer 2, for example. According to one embodiment, the pattern layer 12 comprises at least one translucent area through which light can pass and at least one opaque area preventing the passage of light, thereby defining a particular pattern on the outer surface 8 when the first aspect layer 2 and the pattern layer 12 are illuminated, as will be described in more detail later. Opaque means a light transmission rate of less than 5% and preferably close to or equal to 0%. In a variant, the pattern layer 12 may be arranged to be fully translucent but limit the passage of light, so that the interior portion of the trim element 1 extending to the side of the inner surface 10 of the first aspect layer 2 is invisible from the exterior of the trim element 1. In other words, when a user looks at the outer surface 8, he or she does not see what extends beyond it to the interior of the trim element 1. To this end, the pattern layer 12 has a light transmission rate of 10% or less, for example. It is understood that such a low light transmission rate may also apply to the translucent area(s) of the pattern layer 12 when the pattern layer 12 also comprises opaque areas.

In a variant, the pattern layer 12 extends over the outer surface 8 of the first aspect layer. In this case, a transparent protective layer extends over the pattern layer 12, for example, and forms at least a portion of the visible surface of the trim element, at least opposite the display area of the outer surface 8.

The first obturation layer 4 extends on the side of the inner surface 10 of the first aspect layer 2 at least opposite the outer surface display area 8. The first obturation layer 4 extends against the inner surface 10 of the first aspect layer 2 or against the pattern layer 12 when the trim element 1 comprises such a pattern layer 12, for example. The assembly formed by the aspect layer, an obturation layer and a pattern layer 12, if applicable, has a thickness of between 0.175 mm and 2 mm, for example.

The first obturation layer 4 comprises at least two first optical obturation areas 14, each first optical obturation area 14 being configurable between an open position, in which the first optical obturation area 14 allows light to pass from the lighting device 6 to the first aspect layer 2, and a closed position, in which the first optical obturation area 14 prevents the passage of light from the lighting device 6 to the first aspect layer 2. In other words, in the open position, the first optical obturation area 14 is translucent and lets light through, as shown by the first optical obturation area 14a in FIG. 2. In the closed position, the first optical obturation area 14 is opaque and prevents the passage of light, as shown by the first optical obturation area 14b in FIG. 2.

Advantageously, the first obturation layer 4 is formed by a plurality of first optical obturation areas adjacent to each other and forming the entire first obturation layer 4. In other words, according to this embodiment, the first obturation layer 4 does not include an area that is not switchable between an open and a closed position. In a variant, the first obturation layer 4 may comprise non-switchable areas, opposite the opaque area or areas of the pattern layer 12 for example, if such a layer is provided.

According to one embodiment, the first optical obturation areas 14 are identical, i.e. they all have the same shape and dimensions. In a variant, at least one first optical obturation area 14 may have a different shape and/or dimensions than the other first optical obturation areas 14 depending on what is desired to be displayed on the outer surface 8 of the first aspect layer 2, as will be described in more detail later.

Each first optical obturation area is controllable independently of the other first optical obturation areas 14, for example, i.e., each first optical obturation area can be individually placed in the open or closed position. In a variant, groups of first optical obturation areas can be controlled simultaneously. According to this embodiment, the first optical obturation areas 14 of one group may be simultaneously placed in the open position while the first optical obturation areas 14 of another group are in the closed position, and vice versa. Thus, by way of example, in one configuration, every other first optical obturation area 14 is part of a group such that every other first optical obturation area 14 is in the open position, while the first optical obturation areas 14, extending between the first optical obturation areas 14 in the open position, are in the closed position. This configuration is shown as an example in FIG. 2, and the checkerboard pattern displayed on the outer surface 8 corresponding to this configuration is shown in FIG. 3.

When a first optical obturation area 14 is in the open position, the area of the first aspect layer 2 extending opposite this first optical obturation area 14 can thus be backlit. When a first optical obturation area 14 is in the closed position, the area of the first aspect layer 2 extending opposite this first optical obturation area 14 is not backlit even if light is emitted to the first aspect layer 2 through the first obturation layer 4.

The first obturation layer 4 is formed by an electrochemical film or a film of liquid crystals dispersed in a polymeric material, known as a polymer dispersed liquid crystal (PDLC) film, for example. These films make it possible to form optical obturation areas that can be switched between the open and closed position by applying an electric current to the optical obturation areas.

The trim element further comprises at least a second aspect layer 16 and a second obturation layer 18.

The second aspect layer 16 extends against the first obturation layer 14 opposite the first aspect layer 2, for example. In other words, the second aspect layer 16 extends against the inner surface of the first obturation layer 14, for example, as shown in FIG. 1. The second aspect layer 16 is at least partially translucent, i.e. it is translucent at least in an area extending opposite the display area of the outer surface 8. Like the first aspect layer 2, the second aspect layer 16 may be made translucent either by the material forming the second aspect layer 16 or by its thickness. According to one embodiment, the second aspect layer 16 is formed by a translucent film or skin. According to an embodiment, the second aspect layer 16 is of the same nature as the first aspect layer 2.

For example, the second obturation layer 18 extends against the second aspect layer 16 at least opposite the display area of the outer surface 8 and opposite the first obturation layer 4. In other words, the second obturation layer 18 extends against the inner surface of the second aspect layer 16.

The second obturation layer 16 comprises at least two second optical obturation areas 20, each second optical obturation area 20 being configurable between an open position, in which the second optical obturation area 20 allows light to pass from the lighting device 6 to the second aspect layer 16, and a closed position, in which the second optical obturation area 20 prevents the passage of light from the lighting device 6 to the second aspect layer 16. In other words, in the open position, the second optical obturation area 20 is translucent and lets light through, as shown by the second optical obturation area 20a in FIG. 4. In the closed position, the second optical obturation area 20 is opaque and prevents the passage of light, as shown by the second optical obturation area 20b in FIG. 4.

Advantageously, the second obturation layer 16 is formed by a plurality of second optical obturation areas adjacent to each other and forming the entire second obturation layer 16. In other words, according to this embodiment, the second obturation layer 16 does not include an area that is not switchable between an open position and a closed position.

According to one embodiment, the second optical obturation areas 20 are identical, i.e. they all have the same shape and dimensions. In a variant, at least one second optical obturation area 20 may have a different shape and/or dimensions than the other second optical obturation areas 20 depending on what is desired to be displayed on the outer surface 8 of the first aspect layer 2, as will be described in more detail later.

According to one embodiment, the second optical obturation areas 20 may be identical to the first optical obturation areas 14, i.e., have the same shape and dimensions as the latter. In this case, the second optical obturation areas 20 are, for example, not aligned with the first optical obturation areas 14, i.e., a second optical obturation area 20 extends, for example, opposite two portions of two adjacent first optical obturation areas 14. Preferably, at least some of the second optical obturation areas 20 are different from the first optical obturation areas 14, i.e. they have a different shape and/or dimensions to the first optical obturation areas 14, as shown in FIG. 1.

The second optical obturation areas 20 are controllable in a similar manner to the first optical obturation areas 14, for example, i.e., independently of each other and/or by groups of second optical obturation areas 20.

When a second optical obturation area 20 is in the open position, the area of the second aspect layer 16 extending opposite this second optical obturation area 20 can thus be backlit. When a second optical obturation area 20 is in the closed position, the area of the second aspect layer 16 extending opposite this second optical obturation area 20 is not backlit even though light is emitted to the second aspect layer 16 through the second obturation layer 18.

The second obturation layer 16 is of the same nature as the first obturation layer 4, for example, i.e., formed by an electrochemical film or a film of liquid crystals dispersed in a polymer material.

According to one particular embodiment of the invention and as shown in FIGS. 1, 2, 4 and 6, the trim element 1 further comprises a third aspect layer 22 and a third obturation layer 24.

The arrangement and structure of the third aspect layer 22 and the third obturation layer 24 are similar to those of the second aspect layer 16 and the second obturation layer 18, for example, and will not be described again in detail. In particular, it will be noted that what has been described for the second aspect layers 16 and obturation layers 18 also applies to the third aspect layers 22 and obturation layers 24 by adapting the positions of these layers.

Thus, the third aspect layer 22 extends against the inner surface of the second obturation layer 18 and the third obturation layer 24 extends against the inner surface of the third aspect layer 22. The third aspect layer 22 is translucent at least in relation to the display area of the outer surface 8 of the first aspect layer 2. The third obturation layer 24 comprises at least two third optical obturation areas 26, each third optical obturation area 26 being configurable between an open position, in which the third optical obturation area 26 allows light to pass from the lighting device 6 to the third aspect layer 22, and a closed position, in which the third optical obturation area 26 prevents the passage of light from the lighting device 6 to the third aspect layer 22. In other words, in the open position, the third optical obturation area 26 is translucent and lets light through, as shown by the third optical obturation area 26a in FIG. 6. In the closed position, the third optical obturation area 26 is opaque and prevents the passage of light, as shown by the third optical obturation area 26b in FIG. 6 For other features of the third aspect layer 22 and obturation layer 24, reference may be made to what was described for the second aspect layer 16 and obturation layer 18, as noted above.

It is understood that the trim element 1 could comprise other aspect and obturation layer pairs that have the same arrangement and structure as the second and third aspect and obturation layers. These other pairs would then be arranged on the inner surface side of the third obturation layer 24.

The assembly of aspect and obturation layers described above is referred to as the "layer assembly" 28 in the following description. The individual layers of the layer assembly 28 are bonded or laminated to each other, for example, with the aspect layers serving as a support for the obturation layers.

The lighting device 6 extends from the inner surface side of the layer assembly 28, i.e. against the inner surface of the second obturation layer 18 or the third obturation layer 24 or additional obturation layer, depending on the number of aspect and obturation layers provided in the layer assembly 28.

According to the embodiment shown in FIGS. 1, 2, 4 and 6, the lighting device 6 includes at least one light source 30 and at least one light guide 32.

The light source 30 is formed by at least one light emitting diode emitting light in the visible range, for example. It is understood that the lighting device 6 may comprise a plurality of light sources, formed by light emitting diodes, for example, emitting different colored light, for example.

The light guide 32 is arranged to guide the light emitted by one or more light sources 30 towards the layer assembly 28 and more particularly to direct this light towards the outer surface 8 of the first aspect layer 2. The light guide 32 is thus made of a material suitable for transmitting light, such as a transparent plastic material. This material is polycarbonate (PC) or polymethylmethacrylate (PMMA), for example.

The light guide 32 extends against the inner surface of the layer assembly 28 at least opposite the entire display area of the first aspect layer 2. According to the embodiment shown in the figures, the light guide 32 encapsulates the light source(s) 30. "Encapsulate" means that the light guide 32 encases the light source(s) 30 such that all of the light emitted from the light sources 30 is injected into the light guide 32. The shape of the light guide 32 is further arranged so that light emitted from the light sources 30 not directed directly towards the outer surface 8 of the first aspect layer 2 is redirected towards this outer surface 8, by reflection from the walls of the light guide 32, for example.

According to one embodiment, the light guide 32 also encapsulates the obturation layer forming the inner surface of the layer assembly 28, such as the third obturation layer 24 according to the embodiment shown in the Figures.

According to the embodiment shown in the Figures, the trim element 1 further comprises a support 34 extending over the inner surface of the layer assembly 28 and encapsulating the light guide 32. In particular, the support 34 is arranged to give its rigidity and shape to the trim element 1. In particular, the layer assembly 28 conforms to the shape of the outer surface of the support 34. "Encapsulating the light guide" means that the light guide 32 extends completely within the support 34 and that the support 34 covers all walls of the light guide 32 apart from what is applied against the inner surface of the layer assembly 28.

The encapsulation of the light guide 32 on the light source(s) 30 and on the inner surface of the layer assembly 28 and the encapsulation of the support 34 on the light guide 32 and on the layer assembly 28 are achieved by over molding, for example.

According to one embodiment, the light guide 32 is further encapsulated by a reflective material arranged to reflect light rays from the light source(s) 30 on the walls of the light guide 32 towards the outer surface 8 of the first aspect layer 2. The reflective material has a light reflection rate of 75% or greater, for example. The reflective material is formed by a reflective layer applied to the walls of the light guide 32, for example, optionally between the light guide 32 and the support 34. In a variant, the support 34 is directly made of a reflective material so that the reflective material encapsulates the light guide 32. Thus, all of the light emitted from the light source(s) 30 is guided to the outer surface 8 of the first aspect layer 2, i.e. at least to the display area thereof, by passing through the layer assembly 28.

The above-described trim element 1 makes it possible to make the appearance of at least the display area of the outer surface 8 of the first aspect layer 2 highly switchable by placing the individual optical obturation areas of the individual obturation layers in an open or closed position, as will now be described.

Figure 2:
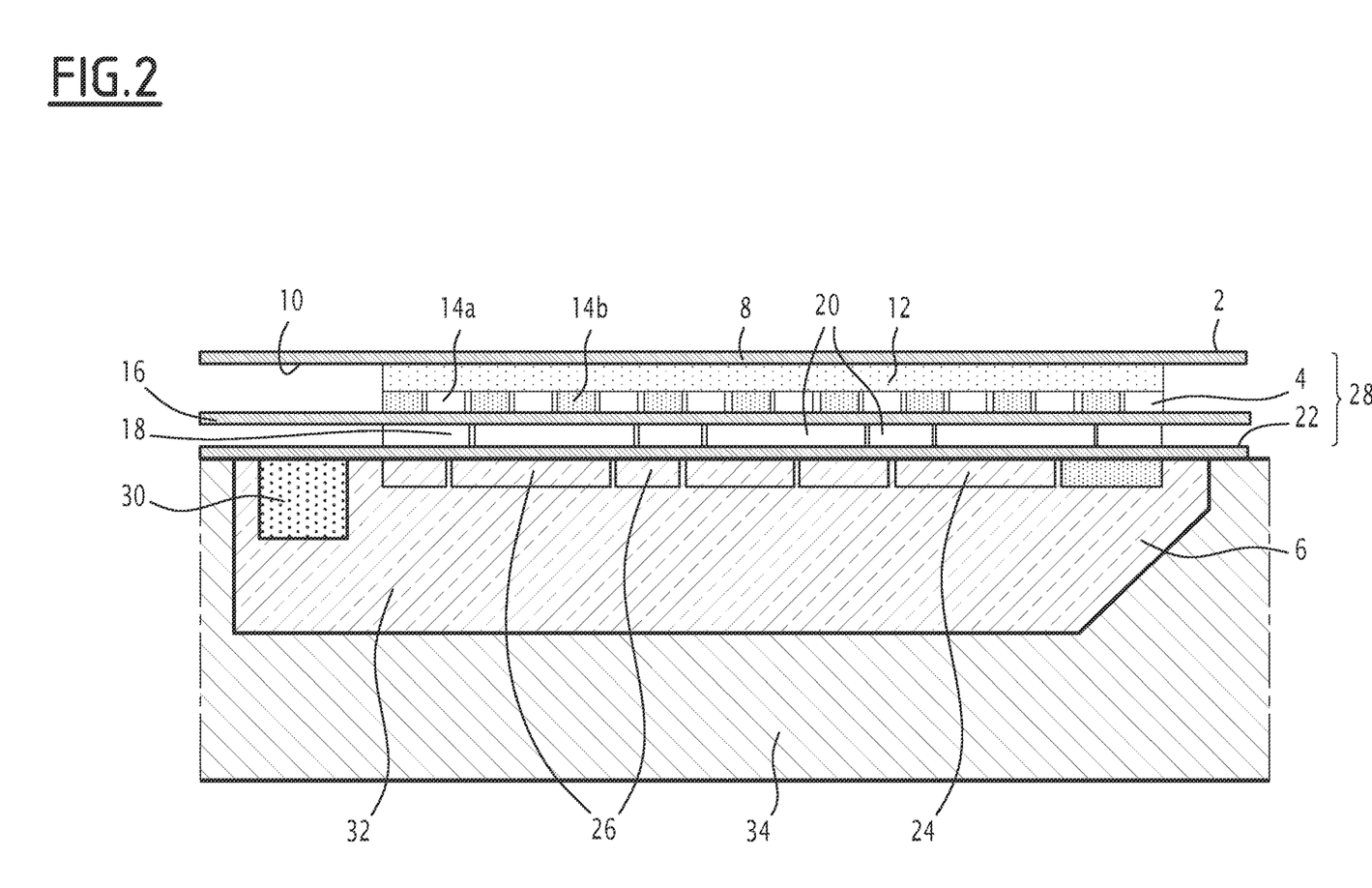
FIG. 2 is a schematic cross-sectional representation of the trim element of FIG. 1, in a first configuration.
Figure 3:
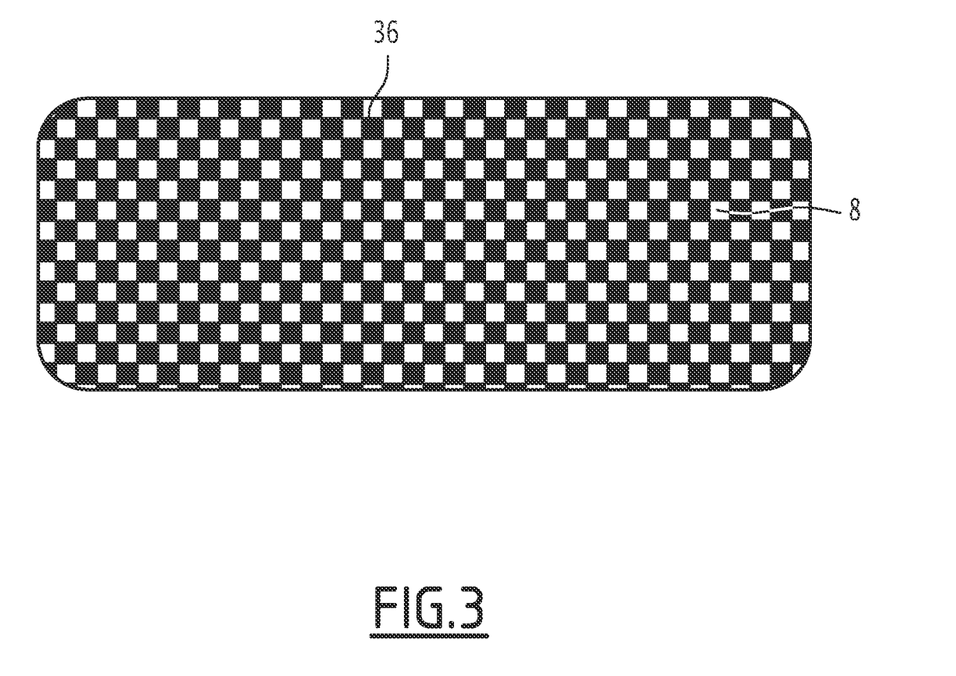
FIG. 3 is a schematic representation of an example of the appearance of the outer surface of the trim element of FIG. 1 in the first configuration.
Figure 4:
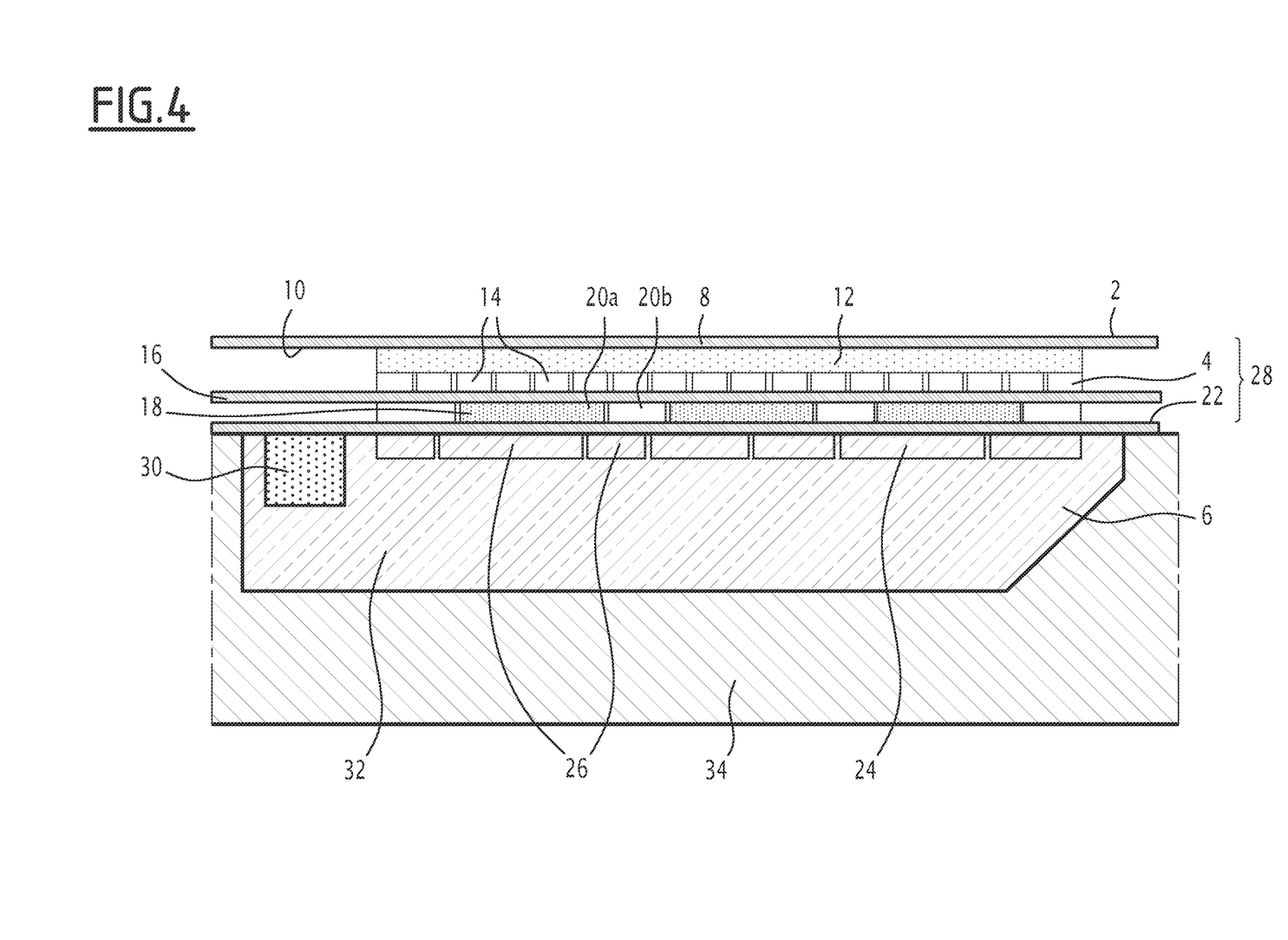
FIG. 4 is a schematic cross-sectional representation of the trim element of FIG. 1, in a second configuration.
Figure 5:
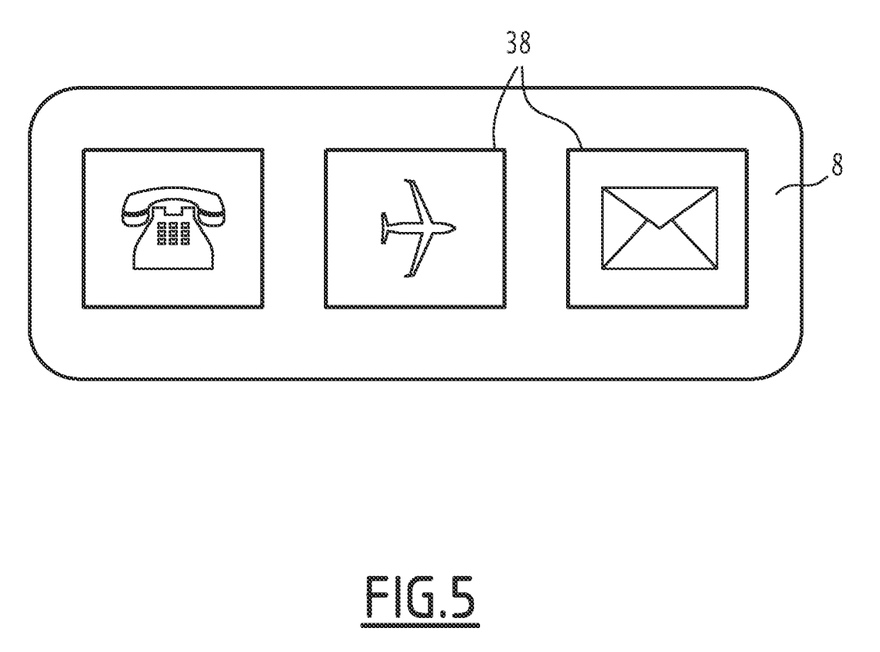
FIG. 5 is a schematic representation of an example of the appearance of the outer surface of the trim element of FIG. 1 in the second configuration.

The trim element 1 is thus configurable between several configurations, and in particular at least one off configuration shown in FIG. 1, a first configuration shown in FIGS. 2 and 3 and a second configuration shown in FIGS. 4 and 5. These different configurations will be described with reference to the embodiment in which the trim element comprises first, second and third aspect layers 2, 16, 22 and obturation layers 4, 18, 24. However, in some embodiments, the trim element may comprise only the first and second appearance and obturation layers or the trim element may comprise more than three appearance and obturation layers.

In the off configuration, all optical obturation areas, namely all first, second and third optical obturation areas 14, 18 and 26 are in the closed position. Thus, in this off configuration, the first aspect layer 2 is not backlit and the appearance of the outer surface 8 of the first aspect layer 2 is substantially uniform and is that of the first aspect layer 2 when viewed in natural light.

In the first configuration, the second and third optical obturation areas 18 and 26 are in the open position. Thus, the light emitted by the lighting device 6 is transmitted unobstructed to the first obturation layer 4. In the first configuration, at least one first optical obturation area 14 is in the open position, so as to backlight at least one area of the first aspect layer 2 and to have on the outer surface 8 of this first aspect layer at least one illuminated area in the shape of the first optical obturation area 14 that is in the open position. By placing a plurality of first optical obturation areas 14 in the open position and leaving others in the closed position, it is thus possible to display a backlit pattern 36 on the outer surface 8, as shown in FIG. 3. The checkerboard pattern of FIG. 3 is thus achieved by placing every other first optical obturation area 14 in the open position and leaving the other first optical obturation areas in the closed position. It is understood, however, that the pattern 36 shown in FIG. 3 is for illustrative purposes only, and that other pattern shapes may be contemplated depending on the number, shape and size of the first optical obturation areas 14 and on which ones are placed in the open position and which ones are left in the closed position in the first configuration. Furthermore, the pattern 36 in FIG. 3 is a decorative pattern, but it is also understood that the first configuration can be arranged to display information on the outer surface 8, in the form of pictograms or the like, for example, as will be described with reference to the other configurations.

In the second configuration, the first and third optical obturation areas 14 and 26 are in the open position. Thus, light emitted from the lighting device 6 is transmitted unobstructed to the second obturation layer 18 and light passing through the second obturation layer 18 is transmitted unobstructed to the outer surface 8 of the first aspect layer 2. In the second configuration, at least one second optical obturation area 20 is in the open position so as to backlight at least one area of the first aspect layer 2 and to have on the outer surface 8 of that first aspect layer at least one illuminated area in the shape of the second optical obturation area 20 that is in the open position. By placing a plurality of second optical obturation areas 20 in the open position and leaving others in the closed position, it is thus possible to display a backlit pattern on the outer surface 8, as shown in FIG. 5, which pattern is advantageously different from that displayed in the first configuration. Thus, according to the embodiment shown in FIG. 5, the area of the first aspect layer 2 illuminated in the second configuration is arranged to delimit a set of pictograms 38 corresponding to different functions of the vehicle and/or electronic device connected to the vehicle, for example. Again, the set of pictograms 38 shown in FIG. 5 is for illustrative purposes only, and other forms of decorative or informative patterns may be contemplated depending on the number, shape, and size of the second optical obturation areas 20 and on which are placed in the open position and which are left in the closed position in the second configuration.

Figure 6:
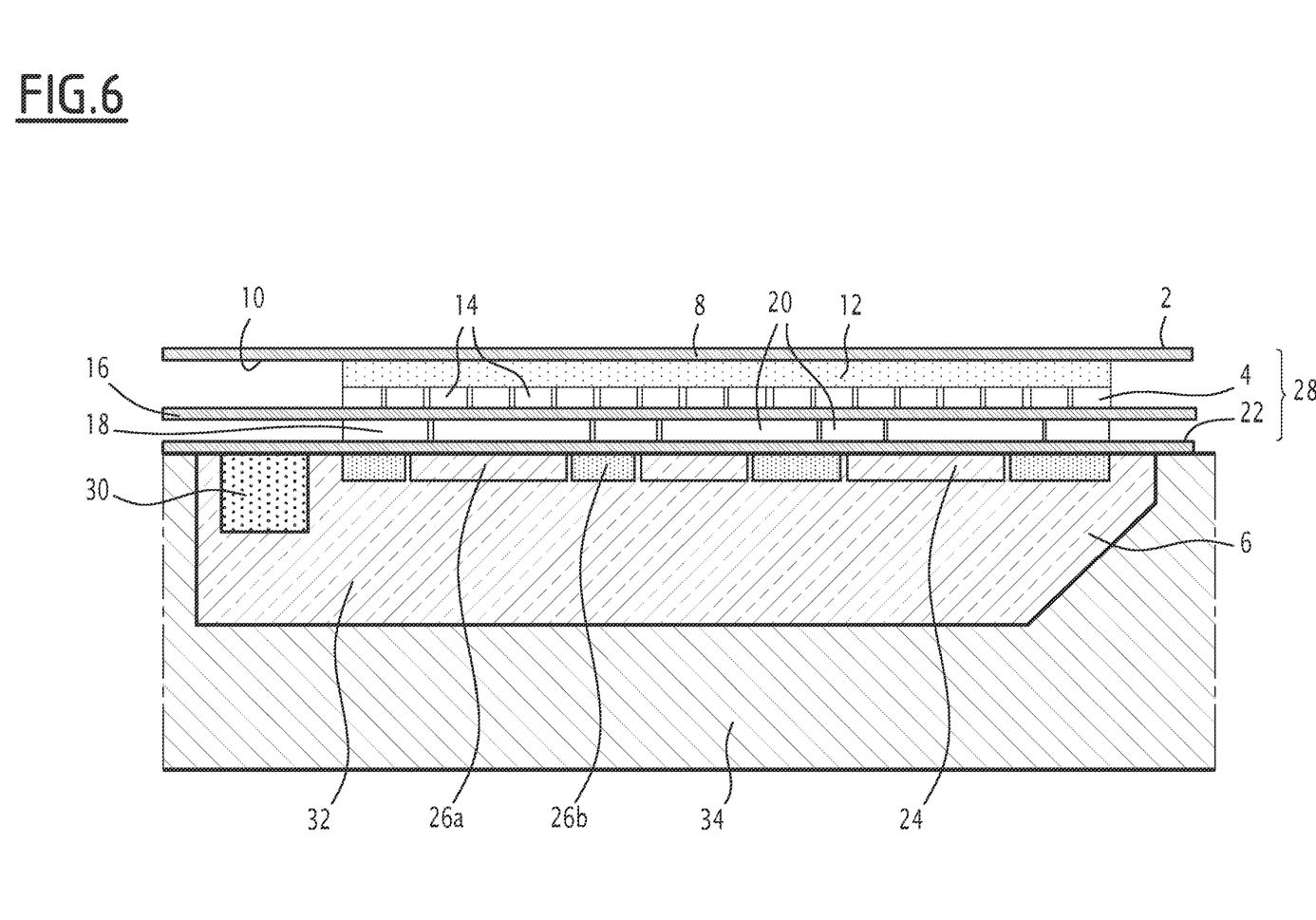
FIG. 6 is a schematic cross-sectional representation of the trim element of FIG. 1, in a third configuration.
Figure 7:
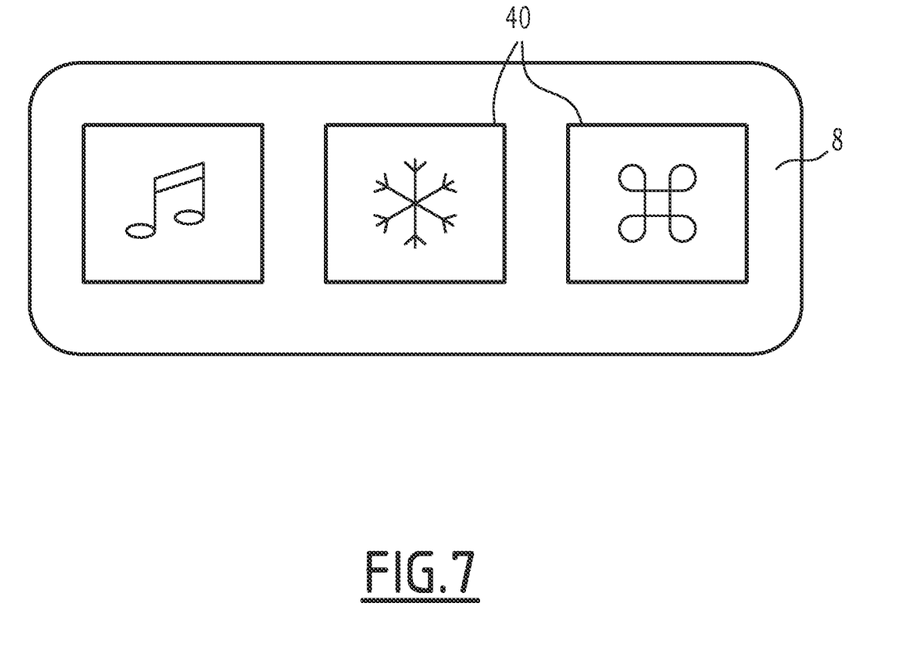
FIG. 7 is a schematic representation of an example of the outer surface appearance of the trim element of FIG. 1 in the third configuration.

When the trim element 1 further comprises third aspect layers 22 and obturation layers 24, the trim element 1 may further be placed in a third configuration shown in FIGS. 6 and 7 in which the first and second optical obturation areas 14 and 20 are in the open position. Thus, light passing through the third obturation layer 24 is transmitted unimpeded to the outer surface 8 of the first aspect layer 2. In the third configuration, at least one third optical obturation area 26 is in the open position so as to backlight at least one area of the first aspect layer 2 and to have on the outer surface 8 of that first aspect layer at least one illuminated area in the shape of the third optical obturation area 26 that is in the open position. By placing a plurality of third optical obturation areas 26 in the open position and leaving others in the closed position, it is thus possible to display a backlit pattern on the outer surface 8, as shown in FIG. 7, which pattern is advantageously different from that displayed in the first and second configurations. Thus, according to the embodiment shown in FIG. 7, the area of the first aspect layer 2 illuminated in the third configuration is arranged to delimit a set of pictograms 40 corresponding to different functions of the vehicle and/or electronic device connected to the vehicle, for example. The pictograms of this set 40 are advantageously different from those of the pictogram set 38 displayed in the second configuration. Again, the set of pictograms 40 shown in FIG. 7 is for illustrative purposes only, and other forms of decorative or informative patterns may be contemplated depending on the number, shape, and size of the third optical obturation areas 26 and which are placed in the open position and which are left in the closed position in the third configuration.

It is understood that another configuration, of placing all optical obturation areas 4, 16 and 24 in the open position can be contemplated. Further, it is understood that other configurations are conceivable, for example, by adding additional aspect and obturation layers and/or by providing multiple first obturation layers and multiple second and possibly third aspect and obturation layers and multiple illumination devices 6 to illuminate multiple display areas on the outer surface 2 of the first aspect layer 2.

In addition, the second and third aspect layers 16 and 22 may be used to modulate the display on the first aspect layer, by providing second and third aspect layers of different colors, for example.

It is understood that the operation of the trim element 1 is substantially similar to that described above when the pattern layer 12 extends over the outer surface 8 of the first aspect layer 2, the only differences being that light passes through the first aspect layer 2 before passing through the pattern layer 12 and that the backlit pattern is displayed on the outer surface of the pattern layer 12 or on the outer surface of a protective layer extending over that pattern layer 12.

It is further understood that the trim element according to the invention may have other functionalities apart from its modular appearance, such as providing one or more capacitive sensors in the trim element to form a tactile surface on the outer surface 8 of the first aspect layer 2 so that a user may control one or more functions of the vehicle and/or device connected to the vehicle by contact with the outer surface 8, in connection with the pictograms displayed in the second and third configurations, for example.

Switching from one configuration to another is, for example, controlled by a control device (not shown) for the trim element, which may be linked to the vehicle's electronic system and be arranged to switch from one configuration to another automatically, depending on the configuration of the passenger compartment in which the trim element is installed and/or manually depending on a user's preferences, for example.

The invention claimed is:

1. A vehicle trim element comprising a first at least partially translucent aspect layer defining an outer surface and an inner surface, opposite the outer surface, at least one lighting device extending on the side of the inner surface of the first aspect layer and emitting light toward said first aspect layer, and a first obturation layer extending between the lighting device and the first aspect layer, said first obturation layer comprising at least two first optical obturation areas, each first optical obturation area being configurable between an open position, in which said first optical obturation area allows light to pass from the lighting device to the first aspect layer, and a closed position, in which said first optical obturation area prevents the passage of light from the lighting device to the first aspect layer, wherein the trim element comprises at least one at least partially translucent second aspect layer extending between the lighting device and the first aspect layer and at least one second obturation layer extending between the lighting device and the second aspect layer, said second obturation layer comprising at least two second optical obturation areas each second optical obturation area being configurable between an open position, in which said second optical obturation area allows light to pass from the lighting device to the second aspect layer, and a closed position, in which said second optical obturation area prevents the passage of light from the lighting device to the second aspect layer.

2. The trim element according to claim 1, said trim element being configurable at least between:
- a first configuration, in which the second optical obturation areas are in the open position and at least one of the first optical obturation areas is in the open position so that the area of the first aspect layer facing said first optical obturation area in the open position is illuminated by the lighting device,
- a second configuration, in which the first optical obturation areas are in the open position and at least one of the second optical obturation areas is in the open position so that the area of the first aspect layer facing said second optical obturation area in the open position is illuminated by the lighting device.

3. The trim element according to claim 2, wherein the area of the first aspect layer illuminated in the first configuration has an appearance different to the area of the first aspect layer illuminated in the second configuration.

4. The trim element according to claim 1, further comprising a third, at least partially translucent aspect layer extending between the lighting device and the second obturation layer and a third obturation layer extending between the lighting device and the third aspect layer, said third obturation layer comprising at least two third optical obturation areas, each third optical obturation area being configurable between an open position, in which said third optical obturation area lets light pass from the lighting device to the third aspect layer, and a closed position, in which said third optical obturation area prevents the passage of light from the lighting device to the third aspect layer.

5. The trim element according to claim 4, said trim element being configurable at least between:
- a first configuration, in which the second optical obturation areas are in the open position and at least one of the first optical obturation areas is in the open position so that the area of the first aspect layer facing said first optical obturation area in the open position is illuminated by the lighting device,
- a second configuration, in which the first optical obturation areas are in the open position and at least one of the second optical obturation areas is in the open position so that the area of the first aspect layer facing said second optical obturation area in the open position is illuminated by the lighting device, wherein the third optical obturation areas are in the open position in the first configuration and in the second configuration, the trim element being further configurable into a third configuration wherein the first optical obturation areas and the second optical obturation areas are in the open position and at least one of the third optical obturation areas is in the open position so that the area of the first aspect layer facing said third optical obturation area in the open position is illuminated by the lighting device.

6. The trim element according to claim 1, further comprising at least one pattern layer extending between the first aspect layer and the first obturation layer or on the outer surface of the first aspect layer, said pattern layer comprising at least one translucent area allowing the passage of the light emitted by the lighting device and at least one opaque area preventing the passage of the light emitted by the lighting device.

7. The trim element according to claim 1, wherein the lighting device comprises at least one light source and at least one light guide arranged to guide light from the light source to the outer surface.

8. The trim element according to claim 7, wherein the aspect layers and the obturation layers extend over a support, said support extending around the light guide.

9. The trim element according to claim 7, wherein the light guide is coated by a reflective material arranged to reflect light from the light source to the outer surface.

10. The trim element according to claim 1, wherein each obturation layer is formed by an electrochemical film or a liquid crystal film dispersed in a polymeric material, the optical obturation areas changing from the closed to the open position by application of an electric current to said optical obturation areas.

* * * * *